Figures 1, 2:
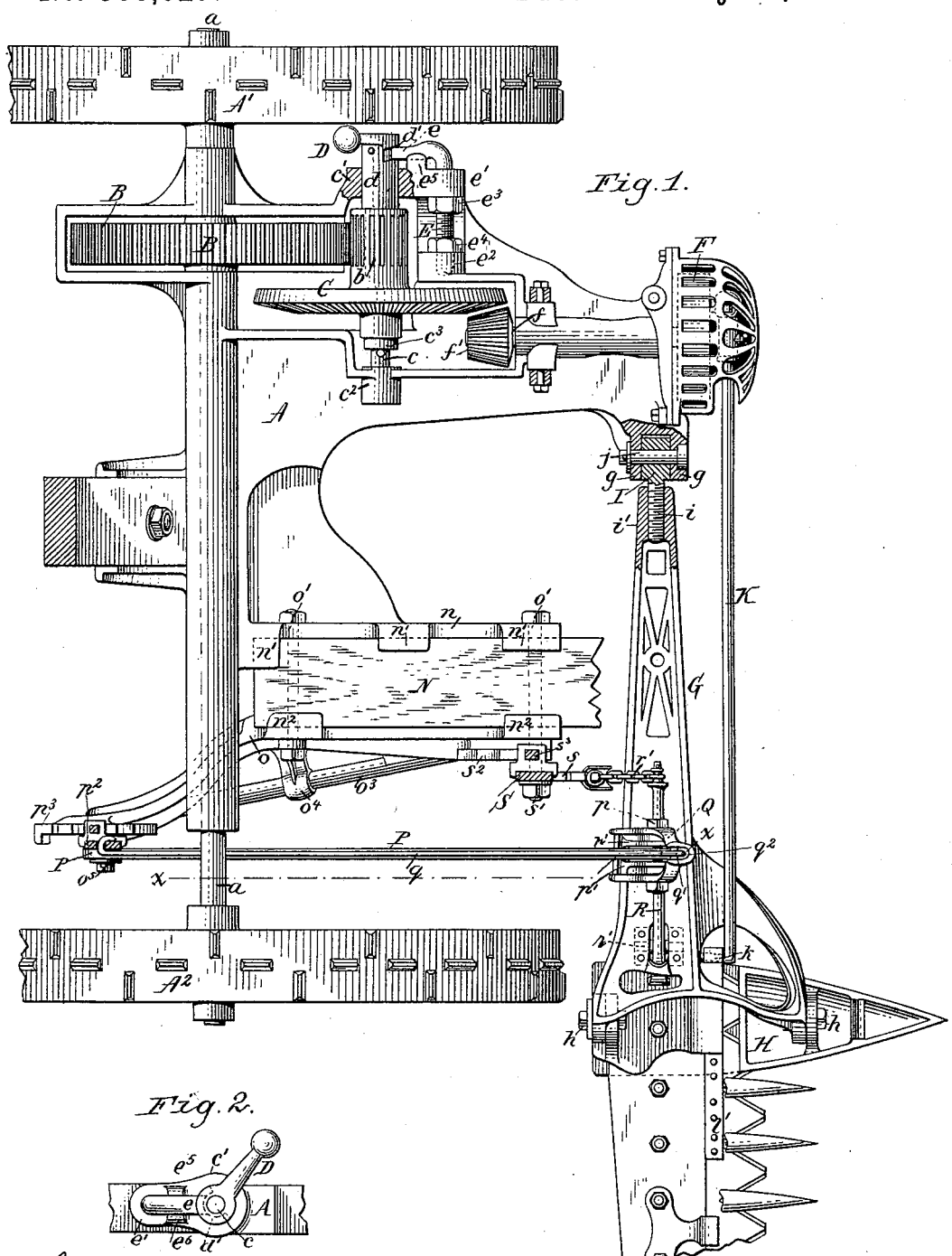

(No Model.) 2 Sheets—Sheet 1.

G. G. CROWLEY.
MOWING MACHINE.

No. 386,627. Patented July 24, 1888.

Witnesses: Chas. J. Buchheit, Geo. J. Buchheit Jr.

George G. Crowley, Inventor.
By Wilhelm & Bonner,
Attorneys.

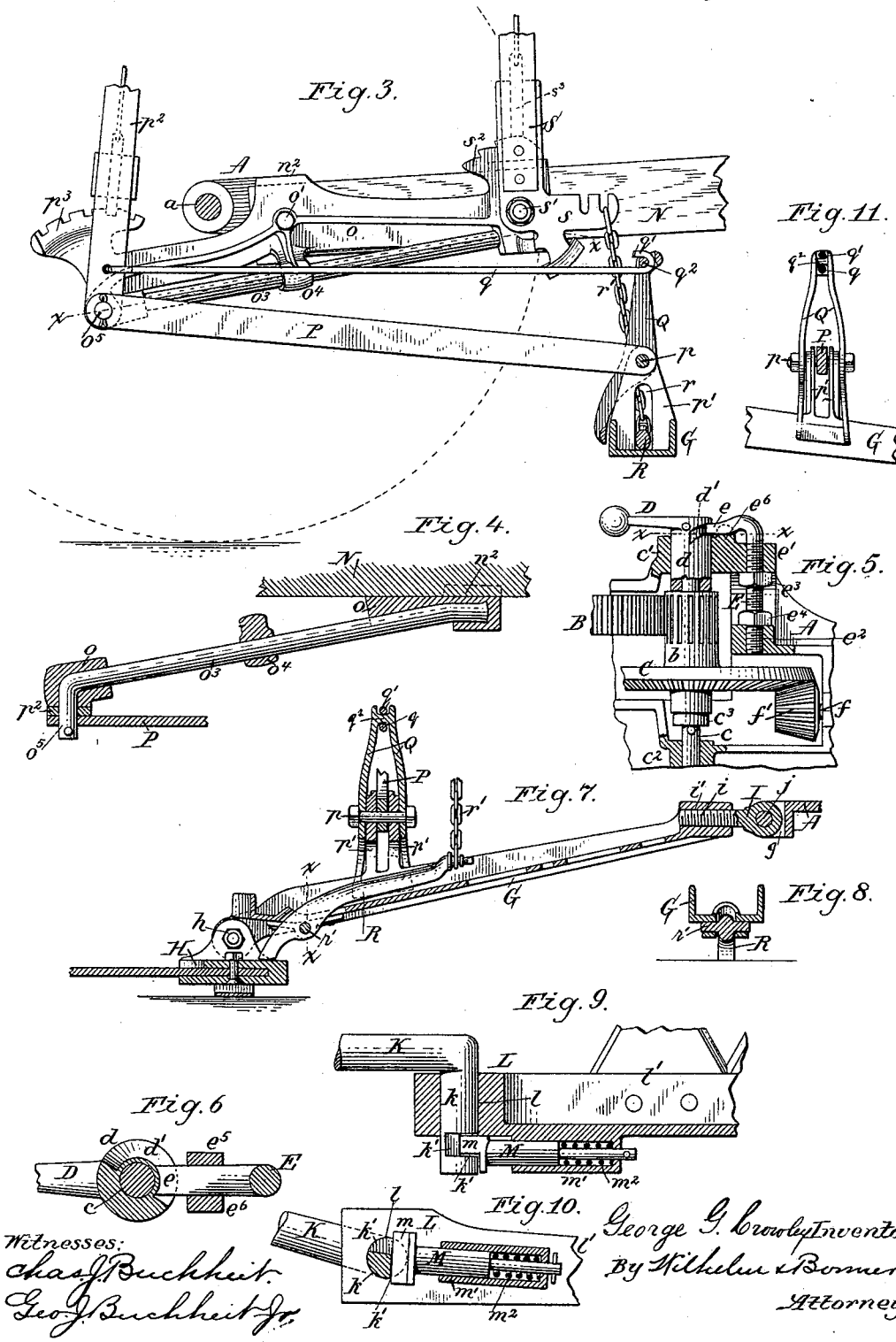

UNITED STATES PATENT OFFICE.

GEORGE G. CROWLEY, OF LITTLE FALLS, NEW YORK, ASSIGNOR TO THE WARRIOR MOWER COMPANY, OF SAME PLACE.

MOWING-MACHINE.

SPECIFICATION forming part of Letters Patent No. 386,627, dated July 24, 1888.

Application filed September 24, 1887. Serial No. 250,551. (No model.)

*To all whom it may concern:*

Be it known that I, GEORGE G. CROWLEY, of Little Falls, in the county of Herkimer and State of New York, have invented new and useful Improvements in Mowing-Machines, of which the following is a specification.

This invention relates to that class of mowing-machines in which the reciprocating knife-bar is actuated by a pitman from a shaft which is driven by gear-wheels from the axle on which the ground-wheels are mounted.

My invention has for its object to improve the construction of the parts whereby the gear mechanism is thrown in and out of gear, and also the parts whereby the knife-bar is actuated, supported, and adjusted.

My invention consists of the improvements which will be hereinafter fully set forth, and pointed out in the claims.

In the accompanying drawings, consisting of two sheets, Figure 1 is a top plan view of a mowing-machine provided with my improvements. Fig. 2 is a side elevation of the arm and connecting parts by which the gearing is thrown in and out of gear. Fig. 3 is a longitudinal vertical section in line $x\ x$, Fig. 1. Fig. 4 is a longitudinal horizontal section in line $x\ x$, Fig. 3. Fig. 5 is a horizontal section of the mechanism by which the gearing is thrown in and out of gear. Fig. 6 is a cross-section in line $x\ x$, Fig. 5, on an enlarged scale. Fig. 7 is a vertical longitudinal section of the connecting-bar. Fig. 8 is a cross-section in line $x\ x$, Fig. 7. Fig. 9 is a horizontal section of the parts connecting the pitman with the knife-bar. Fig. 10 is a vertical section of the same. Fig. 11 is a rear elevation of the lever whereby the finger-bar is rolled.

Like letters of reference refer to like parts in the several figures.

A represents the main frame of the machine, and A' A² the driving or ground wheels mounted upon the axle $a$, which is journaled in the frame A.

B represents a spur-gear secured to the axle $a$, and meshing with a pinion, $b$, which is mounted loosely upon a horizontal arbor, $c$, arranged on the frame A in front of the spur-gear B.

C is a bevel-wheel formed in one piece with the pinion $b$, or secured thereto so as to turn therewith on the arbor $c$. The latter is arranged in bearings $c'\ c^2$, formed in the frame A, near the ends of the arbor $c$, in which bearings the arbor can turn and move lengthwise.

$c^3$ represents a collar secured to the arbor $c$ and bearing against the hub of the wheel C.

$d$ represents a sleeve secured to the arbor $c$ and bearing against the pinion $b$, and inclosing the end of the arbor journaled in the bearing $c'$. The pinion $b$ and bevel-wheel C are held in position on the arbor $c$ by the collar $c^3$ and sleeve $d$, as represented in Fig. 5, so that the pinion $b$ and bevel-wheel C are compelled to follow the lengthwise movement of the arbor $c$, while being free to rotate on the same.

D represents a hand-lever secured to the outer end of the sleeve $d$, as clearly represented in Figs. 1, 2, and 5. The sleeve $d$ is provided with a spiral or cam-shaped groove, $d'$, in which engages a fixed tooth, $e$, attached to the frame, as represented in Fig. 6, so that by turning the lever D in one or the other direction the arbor $c$ is moved lengthwise in its bearings inwardly or outwardly. The tooth $e$ is provided with a horizontal screw-stem, E, which passes with its outer portion through an ear, $e'$, formed on the frame A, and projects with its inner end into a socket, $e^2$, formed in the frame A.

$e^3\ e^4$ represent screw-nuts applied to the screw-shank E, and bearing, respectively, against the ear $e'$ and socket $e^2$, thereby enabling the tooth $e$ to be adjusted horizontally in a direction parallel with the arbor $c$.

$e^5\ e^6$ represent lugs formed on the outer side of the ear $e'$, and bearing against the upper and lower sides of the tooth $e$, whereby the latter is prevented from turning.

$f$ represents the longitudinal shaft, which is arranged in front of the arbor $c$, and provided at its front end with the crank-wheel F and at its rear end with a bevel-pinion, $f'$, with which the bevel-wheel C can be made to mesh. In Fig. 1 the bevel-wheel C is shown out of gear with the pinion $f'$. Upon turning the hand-lever D backwardly the cam-groove $d'$ and tooth $e$ cause the arbor $c$ to move toward the pinion $f'$, whereby the wheel C is thrown into gear with the pinion $f''$, as represented in Fig. 5. By adjusting the tooth $e$ the proper mesh is readily obtained, so that the wheel C meshes neither too hard nor too loosely with the pinion $f'$. The teeth of the pinion $b$ are made long enough to remain in mesh with the spur-gear B in the various positions which the pinion assumes as the arbor $c$ is moved to throw the wheel C in and out of gear.

G represents the transverse connecting-bar, connected at its inner end to the front extension of the frame A, near the crank-wheel F, and hinged at its outer end to the shoe H by two longitudinal pivots, $h\ h$. The front extension of the frame A is provided with two ears, $g\ g$, between which is pivoted an eyebolt, I, by a longitudinal pivot, $j$. The screw-threaded shank $i$ of the eyebolt enters a screw-threaded socket, $i'$, formed at the inner end of the connecting-bar G. The shank $i$ turns loosely in the socket $i'$, so that the connecting-bar is by this means swiveled on the eyebolt. This permits the free movement of the connecting-bar when the cutter-bar is rolled back and prevents cramping and binding of the parts, while it forms a very simple means of connection between the bar G and the frame.

K represents the pitman, which is provided at its outer end with a horizontal pivot, $k$, preferably formed in one piece with the pitman. This pivot passes through an eye, $l$, in the head L of the knife-bar $l'$, and is provided near its end and at the rear side of the knife-head with a notch, $k'$, which extends partly around the pivot, as represented in Figs. 9 and 10.

M represents a spring-bolt, which engages with its head $m$ in the notch $k'$, and which is attached to the rear side of the head L. The shank of the bolt M passes through a casing, $m'$, formed on the rear side of the head L, and containing a spring, $m^2$, whereby the head of the bolt is held in engagement with the pivot $k$. Upon forcing the spring-bolt M back, so that it becomes disengaged from the pivot, the latter can be withdrawn from the eye $l$, thereby disconnecting the pitman from the knife-bar. Upon inserting the pivot $k$ into the eye $l$ the pivot is automatically locked in position by the spring-bolt. The notch $k'$ is made long enough to permit of the requisite rocking motion of the pivot.

The bolt M is prevented from becoming disengaged from the casing $m'$ by a pin in the end of the bolt.

N represents the pole secured to the outer side of a longitudinal arm, $n$, formed on the main frame A in front of the axle $a$.

O represents an auxiliary frame secured to the outer side of the pole N by transverse bolts $o'$, which pass through the auxiliary frame $o$, pole N, and arm $n$, and these parts are held in their proper relative position vertically by lips $n'\ o^2$, formed, respectively, on the arm $n$ and frame $o$, and bearing against the upper and lower sides of the pole. The frame $o$ is formed of cast-iron and strengthened by a brace, $o^3$, of wrought-iron, which connects the front and rear ends of the frame and passes through a central lug, $o^4$, on the frame. The wrought-iron brace $o^3$ is secured in the auxiliary frame by being cast into the same. The rear end of the brace $o^3$ projects laterally beyond the frame $o$ and forms a pivot, $o^5$.

P represents the thrust-bar, which is supported with its rear end on the pivot $o^5$, and connected with its front end to the transverse connecting-bar G, near the shoe H, by a horizontal pivot-bolt, $p$, passing through upright lugs or arms $p'$, formed on the bar G and holding the thrust-bar between them, as clearly represented in Figs. 3 and 11.

$p^2$ is the hand-lever, by which the finger-bar is inclined or tilted, and which is mounted on the pivot $o^5$ between the thrust-bar P and the auxiliary frame $o$. The latter is provided at its rear end with a notched segment, $p^3$, in which engages a catch attached to the lever $p^2$, whereby said lever is locked in position.

$q$ represents a rod connected with its rear end to the hand-lever $p^2$, and with its front end to a lever, Q, by which the finger-bar is rolled, tilted, or inclined. The tilting-lever Q is constructed in the form of a vertically-elongated loop, as represented in Fig. 11, and it is pivoted upon the same bolt, $p$, by which the thrust-bar P is connected with the transverse bar G. This bolt $p$ is arranged in line with the eyebolt I at the inner end of the bar G, as represented in Fig. 7, in order to prevent binding of the parts when the transverse bar G is turned on the eyebolt. The lever Q straddles the lugs $p'$ of the bar G, and its lower arm bears against the rear side of the bar G, while its upper arm projects above the same, and is connected with the front end of the rod $q$, as represented in Fig. 3. By adjusting the hand-lever $p^2$ the lever Q is turned on the pivot $p$, whereby the transverse bar G is turned on the eyebolt I, and the finger-bar is rolled in one or the other direction and its inclination regulated. The front end of the rod $q$ is provided with a vertical hook, $q'$, which engages in a horizontal eye, $q^2$, in the lever Q. This construction permits the rod to be readily attached to the lever before these parts are attached to the reach, and prevents the parts from becoming separated when in the normal position.

R represents the bearing-lever, which is arranged lengthwise on the transverse connecting-bar G and pivoted on the pivot $r'$ to the under side of the latter, as represented in Fig. 7. The short lower arm of the lever R bears upon the shoe H on the inner side of the pivots of the latter, and the long upper arm of the lever R extends inwardly over the bar G through openings $r$ in the lugs $p'$ thereof. The inner end of the long upper arm of the lever R is connected by a chain, $r^2$, with the short arm $s$ of a hand-lever, S, by which the finger-bar is raised and lowered. The lever S is mounted upon a pivot, $s'$, secured to the front end of the auxiliary frame o, which latter is provided with a notched segment, $s^2$, upon which the lever S is locked by a suitable catch, $s^3$. Upon raising the inner end of the bearing-lever R by the hand-lever S the inner end of the shoe is first depressed and the outer end of the finger-bar raised until the lever R reaches the upper ends of the openings r, when the turning movement of the lever R on its pivot ceases, and the finger and the transverse bar G are raised together.

I claim as my invention—

1. The combination, with the cutter mechanism, the longitudinal shaft f, provided with the bevel-pinion f' and a crank-wheel, and the driving-shaft a, provided with a spur-gear, B, of an intermediate transverse arbor made lengthwise movable, and a spur-pinion, b, and bevel-wheel C, secured together and turning loosely upon the arbor, upon which they are held against longitudinal movement, substantially as set forth.

2. The combination, with the cutter mechanism, the longitudinal shaft f, provided with a bevel-pinion, f', and a crank-wheel, and the driving-shaft a, provided with a spur-gear, B, of an intermediate transverse arbor, c, a hand-lever, D, and cam-groove d', secured to said arbor, a tooth, e, secured to the frame and engaging with said cam-groove, and a spur-pinion, b, and bevel-wheel C, secured together and turning loosely upon the arbor, upon which they are held against longitudinal movement, substantially as set forth.

3. The combination, with the main frame, the cutter mechanism, the longitudinal shaft f, provided with a bevel-pinion, f', and a crank-wheel, and the driving-shaft a, provided with a spur-wheel, B, of an intermediate transverse arbor, c, a hand-lever, D, and cam-groove d', secured to said arbor, a spur-pinion, b, and bevel-wheel C, secured together and turning loosely upon the arbor, upon which they are held against longitudinal movement, and a tooth, e, engaging with said cam-groove and secured to the main frame, and made adjustable therein toward and from the longitudinal shaft f, substantially as set forth.

4. The combination, with the main frame A and pole N, of the cast auxiliary frame o, provided with a wrought brace, $o^3$, which is cast into the frame o and connects the ends thereof, substantially as set forth.

5. The combination, with the main frame A and pole N, thrust-bar P, and lever $p^2$, of the cast auxiliary frame o, provided with a wrought brace, $o^3$, cast into the frame o, and having its rear end projecting laterally beyond the frame o, forming a pivot, $o^5$, for the said thrust-bar and lever, substantially as set forth.

6. The combination, with the transverse connecting-bar G, having upwardly-projecting lugs p' p', provided with upright slots r, and the shoe pivoted to the bar G, of the bearing-lever R, arranged lengthwise of the connecting-bar, with its upper arm in the slots r and pivoted to the connecting-bar, and means for operating said bearing-lever, substantially as set forth.

Witness my hand this 20th day of September, 1887.

GEORGE G. CROWLEY.

Witnesses:
JOHN W. FITZGERALD,
JOSEPH B. RIDDLE.